United States Patent Office
3,574,751
Patented Apr. 13, 1971

3,574,751
2,3,4,5,6-PENTACHLOROBENZYLIDENAMINE DERIVATIVES
Toshiaki Ozaki and Sigeo Yamamoto, Toyonaka-shi, Toshiyuki Wakatsuki, Kyoto, Akira Fujinami, Takarazuka-shi, Katsuji Nodera, Nishinomiya-shi, and Yoshihiko Nishizawa, Nara-shi, Japan, assignors to Sumitomo Chemical Company, Ltd., Osaka, Japan
No Drawing. Filed Dec. 18, 1967, Ser. No. 691,235
Claims priority, application Japan, Jan. 17, 1967, 42/3,529
Int. Cl. C07c *119/00*
U.S. Cl. 260—566    8 Claims

ABSTRACT OF THE DISCLOSURE 2,3,4,5,6-pentachlorobenzylidenamine derivatives as novel agricultural fungicides, particularly chemicals suitable for control of rice blast, which have the structural formula,

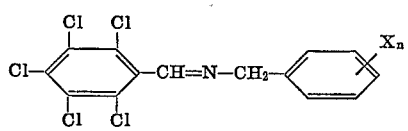

wherein X is a hydrogen atom, a lower alkyl group, a halogen atom or a nitro group and $n$ is 1 or 2.

---

The above compounds are produced by reacting corresponding benzaldehydes with benzylamines.

This invention relates to novel benzylidenamines. More particularly, the invention pertains to 2,3,4,5,6-pentachlorobenzylidenamine derivatives having strong fungicidal activities.

The novel compounds of the present invention are represented by the formula,

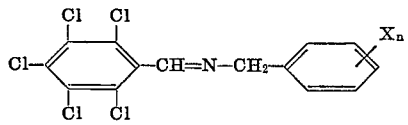

wherein X is a hydrogen atom, a lower alkyl group, a halogen atom or a nitro group and $n$ is 1 or 2.

The novel compounds of the invention have effects on various diseases and are particularly suitable for the control of rice blast.

For the control of rice blast, organo-mercury compounds have effectively been used every year in large quantities. However, the use of such compounds containing an element poisonous to the human body is a serious problem not only for those engaged in agriculture who handle the compounds but also for general consumers. Rice blast is a disease which gives the greatest damage to the rice crop. In order to prevent such disease, there has been desired the advent of fungicides, which are strong in fungicidal activity and which are nontoxic towards men and cattle and have no phytotoxicity on crops.

The object of the present invention is to provide excellent fungicides which can satisfy the above desire.

The present inventors made repeated studies with an aim to discover fungicides which are not only excellent in effectiveness but also can be used without any fear. As the result, the inventors have attained the present invention.

The benzylidenamines of the present invention are novel compounds and can be readily obtained in high yields by reacting pentachlorobenzaldehyde with a benzylamine represented by the formula

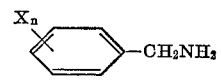

(II)

wherein X and $n$ have the same significances as in the case of the Formula I. That is, when 2,3,4,5,6-pentachlorobenzaldehyde is reacted, preferably in an inert solvent such as benzene, toluene, ether, methanol or ethanol, with benzylamines represented by the Formula II at from room temperature to the boiling point of the employed solvent for several hours, whereby the desired 2,3,4,5,6-pentachlorobenzylidenamines represented by the Formula I are obtained almost purely, in general, in good yield after distilling off the solvent.

Typical examples of the benzylamines represented by the Formula II which are used in the present invention are as shown below, but the scope of the present invention is not limited thereby.

Benzylamine, 2 - methylbenzylamine, 3 - methylbenzylamine, 4 - methylbenzylamine, 2,3-dimethylbenzylamine, 2,4-dimethylbenzylamine, 2,5-dimethylbenzylamine, 2,6-dimethylbenzylamine, 3,4 - dimethylbenzylamine, 3,5-dimethylbenzylamine, 2-chlorobenzylamine, 3-chlorobenzylamine, 4 - chlorobenzylamine, 2,3 - dichlorobenzylamine, 2,4 - dichlorobenzylamine, 2,6-dichlorobenzylamine, 3,4-dichlorobenzylamine, 3,5 - dichlorobenzylamine, 2-nitrobenzylamine, 3 - nitrobenzylamine, and 4 - nitrobenzylamine.

All the present 2,3,4,5,6-pentachlorobenzylidenamine derivatives represented by the Formula I are novel compounds. They have prominent effects on fungi injurious to agricultural crops, particularly on rice blast fungus (*Pyricularia oryzae*), are low toxic and are excellent fungicides usable in place of the organo-mercury preparations.

The preparation of the novel compounds of the present invention will be illustrated in detail below with references to examples.

EXAMPLE

Generally, the compounds were prepared in the following manner:

1.0 mol of 2,3,4,5,6-pentachlorobenzaldehydes was dissolved in 10 times the amount of said aldehyde of benzene. To the solution, 1 mol of a benzylamine was gradually added with stirring. Subsequently, the mixture was heated and refluxed for 30 minutes. After completion of the reaction, benzene was removed by distillation to obtain a desired 2,3,4,5,6-pentachlorobenzylidenamine derivative in pure form and in high yield.

| | | | | | Resulting 2,3,4,5,6-pentachlorobenzylidenamine derivative | | | | | | | | |
|---|---|---|---|---|---|---|---|---|---|---|---|---|---|
| | | | | | | | Elementary analysis (percent) | | | | | | |
| | | | | | | | Calculated | | | Found | | | |
| Example No. | Starting aldehyde | Starting benzylamine | Structural formula | Physical constant (M.P.) °C. | Yield, percent | | C | H | N | Cl | C | H | N | Cl |
| 1 | 2,3,4,5,6-pentachlorobenzaldehyde | Benzylamine | Cl-C6Cl4-CH=N-CH2-C6H5 | 100–103 | 99 | | 45.75 | 2.19 | 3.81 | 48.24 | 44.94 | 2.14 | 3.73 | 49.01 |
| 2 | do | 2-chlorobenzylamine | Cl-C6Cl4-CH=N-CH2-C6H4(Cl) | 123–125 | 99 | | 41.83 | 1.76 | 3.48 | 52.93 | 41.59 | 1.84 | 3.26 | 52.77 |
| 3 | do | 4-chlorobenzylamine | Cl-C6Cl4-CH=N-CH2-C6H4(Cl) | 147–149 | 100 | | 41.83 | 1.76 | 3.48 | 52.93 | 42.01 | 1.83 | 3.48 | 52.89 |
| 4 | do | 2,4-dichlorobenzylamine | Cl-C6Cl4-CH=N-CH2-C6H3(Cl)2 | 146–149 | 98 | | 38.53 | 1.36 | 3.21 | 56.87 | 38.23 | 1.41 | 3.59 | 56.20 |
| 5 | do | 3,4-dimethylbenzylamine | Cl-C6Cl4-CH=N-CH2-C6H3(CH3)2 | 110–113 | 99 | | 48.58 | 3.06 | 3.54 | 44.82 | 48.97 | 3.19 | 3.45 | 44.76 |
| 6 | do | 4-nitrobenzylamine | Cl-C6Cl4-CH=N-CH2-C6H4(NO2) | 183–185 | 100 | | 40.76 | 1.71 | 6.79 | 42.98 | 40.72 | 1.67 | 6.88 | 43.14 |
| 7 | do | 3-methylbenzylamine | Cl-C6Cl4-CH=N-CH2-C6H4(CH3) | 80–83 | 100 | | 47.22 | 2.64 | 3.67 | 46.47 | 47.45 | 2.87 | 3.64 | 46.23 |

The compounds of the present invention are stable, have no detrimental action on crops, and can protect crops from the attack of desease fungi for a long period of time. The excellent fungicidal effects of the present compounds and the non-toxicity thereof towards crops are useful and valuable characteristics as agricultural fungicides. In addition, the present compounds contain no such injurious heavy metal as contained in mercury preparations and hence have great advantages in that they are less toxic and are safe in handling.

In actual application, the present compounds may be used in pure form without incorporation of a carrier. Alternatively, they may be used in admixture with inert carriers for easier application as agricultural fungicides, and can be used in any of the ordinarily adopted forms such as dusts, wettable powders, emulsifiable concentrates, granules. Further, the compounds may be used in admixture with other chemicals, whereby the effects thereof can be made more broad and accurate. For example, it is not objectionable at all to use the present compounds in admixture with antibiotics such as Blasticidin-S and Kasugamycin, organo-phosphorous fungicides such as O,O-diethyl-S-benzylphosphorothiolate and O-ethyl-S,S-diphenylphosphorodithiolate, or organo-arsenic fungicides such as iron methylarsonate and the like. Further, for the purpose of simultaneous control of 2 or more kinds of injurious insects and diseases, they may be used in admixture with such insecticides 1,2,3,4,5,6-hexachlorocyclohexane,
O,O-diethyl-O-p-nitrophenylphosphorothiolate,
S-[1,2-bis(ethoxycarbonyl)ethyl]O,O-dimethylphosphorodithiolate,
O,O-dimethyl-S-(N-methylcarbamoylmethyl)phosphorodithiolate,
O,O-dimethyl-O-p-nitro-m-methylphenylphosphorothiolate,
O,O-diethyl O-(2-isopropyl-4-methyl-6-pyrimidyl) phosphorothiolate,
O-ethyl-O-p-nitrophenyl phenylphosphonothiolate,
N-methyl-O-α-naphthylcarbamate and
3,4-dimethylphenyl-N-methylcarbamate, and the mixtures may be further incorporated with the aforesaid fungisides. Furthermore they may be used in admixture, in addition thereto, with such agricultural chemicals as herbicides, nematocides and mitecides, and with fertilizers, and synergistic effects would be expectable depending on combinations.

The manner of preparation of the present compounds is set forth in the aforesaid examples.

The present invention will be illustrated in further detail below with reference to examples, but it is needless to say that the kinds and mixing proportions of compounds and additives are variable within wide ranges without being limited to those described in the examples. In the examples, the names of the compounds are represented by the numbers of the compounds exemplified in the above Examples 1 to 7, and all the parts and percentages are by weight.

EXAMPLE 8

50 parts of the compound of Example 4, 5 parts of a wetting agent of an alkylbenzenesulfonate type and 45 parts of diatomaceous earth were thoroughly pulverized and mixed together to obtain a wettable powder containing 50% of active ingredient. In application, the wettable powder was diluted with water and the solution was sprayed.

EXAMPLE 9

25 parts of the compound of Example 6, 4.5 parts of a wetting agent of a higher alcohol sulfonate type, 0.5 part of polyvinyl alcohol, and 70 parts of clay were thoroughly pulverized and mixed together to obtain a wettable powder containing 25% of active ingredient. In application, the wettable powder was diluted with water and the solution was sprayed.

EXAMPLE 10

3 parts of the compound of Example 1 and 97 parts of a talc-clay mixture were thoroughly pulverized and mixed together to obtain a dust containing 3% of active ingredient. In application, the dust was sprayed in such state.

EXAMPLE 11

4 parts of the compound of Example 7 and 96 parts of clay were thoroughly pulverized and mixed together to obtain a dust containing 4% of active ingredient. In application, the dust is sprayed in such state.

In order to substantiate the excellent fungicidal effects of the present compounds, typical test results will be shown below.

TEST EXAMPLE

To a rice plant (variety: Wase Asahi) which had been cultured in a 9 cm. (in diameter) flower pot to the 3-leaves stage, each 7 ml. per pot of solutions of test chemicals which were prepared by diluting wettable powders obtained according to a similar manner of Example 8 or 9, at given concentrations were individually sprayed. One day after, the rice plant was sprayed and inoculated with a suspension of spores of Pyricularia oryzae. 4 days thereafter, the number of generated spots was counted and the fungicidal effects of the test chemicals were investigated to obtain the results as shown in the table below. In the table, the control value shows a value calculated according to the following equation.

$$\text{Control value} = \frac{\text{Number of spots in non-treated area} - \text{Number of spots in treated area}}{\text{Number of spots in non-treated area}} \times 100$$

Further, the names of the compounds are represented by the exemplification numbers of the aforesaid examples.

| | Active ingredient concentration, p.p.m. | Control value |
|---|---|---|
| Compounds: | | |
| 1 | 100 | 100 |
| 2 | 100 | 96.7 |
| 3 | 100 | 97.1 |
| 4 | 100 | 93.4 |
| 5 | 100 | 95.3 |
| 6 | 100 | 96.2 |
| 7 | 100 | 100 |
| Phenylmercuric acetate | 30 | 94.8 |
| Non-treatment | | 0 |

What is claimed is:
1. A 2,3,4,5,6 - pentachlorobenzylidenamine derivative represented by the formula,

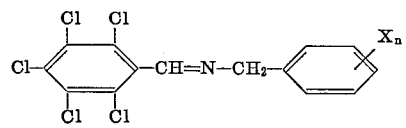

wherein X is a hydrogen atom, a lower alkyl group, a halogen atom or a nitro group and $n$ is 1 or 2.

2. A 2,3,4,5,6 - pentachlorobenzylidenamine derivative represented by the formula,

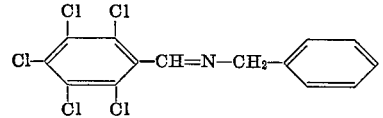

3. A 2,3,4,5,6 - pentachlorobenzylidenamine derivative represented by the formula,

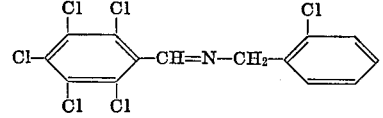

4. A 2,3,4,5,6 - pentachlorobenzylidenamine derivative represented by the formula,

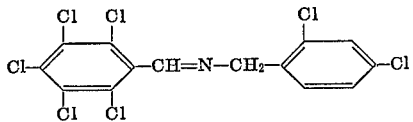

5. A 2,3,4,5,6 - pentachlorobenzylidenamine derivative represented by the formula,

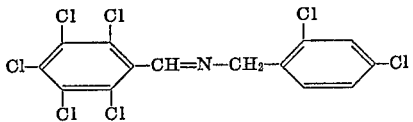

6. A 2,3,4,5,6 - pentachlorobenzylidenamine derivative represented by the formula,

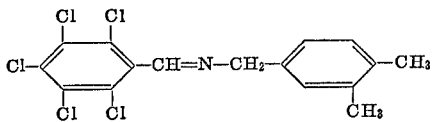

7. A 2,3,4,5,6 - pentachlorobenzylidenamine derivative represented by the formula,

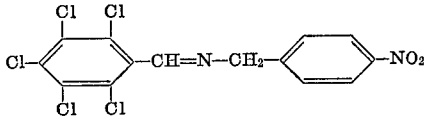

8. A 2,3,4,5,6 - pentachlorobenzylidenamine derivative represented by the formula,

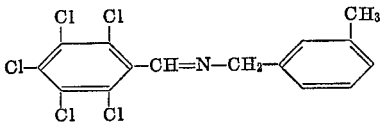

References Cited
FOREIGN PATENTS
979,132   1/1965   Great Britain _____ 260—566

LEON ZITVER, Primary Examiner
G. A. SCHWARTZ, Assistant Examiner

U.S. Cl. X.R.
424—325